US010228847B2

(12) United States Patent
Tsui

(10) Patent No.: US 10,228,847 B2
(45) Date of Patent: *Mar. 12, 2019

(54) ELECTRONIC DEVICE AND AUTOMATICALLY HIDING KEYPAD METHOD AND DIGITAL DATA STORAGE MEDIA

(71) Applicant: HTC CORPORATION, Taoyuan (TW)

(72) Inventor: Yuan-Mao Tsui, Taoyuan (TW)

(73) Assignee: HTC Corporation, Taoyuan (TW)

( * ) Notice: Subject to any disclaimer, the term of this patent is extended or adjusted under 35 U.S.C. 154(b) by 300 days.

This patent is subject to a terminal disclaimer.

(21) Appl. No.: 14/092,702

(22) Filed: Nov. 27, 2013

(65) Prior Publication Data
US 2014/0089838 A1 Mar. 27, 2014

Related U.S. Application Data

(63) Continuation of application No. 12/397,485, filed on Mar. 4, 2009, now Pat. No. 8,624,848.

(30) Foreign Application Priority Data

Apr. 24, 2008 (TW) .............................. 97115067 A

(51) Int. Cl.
G06F 3/0488 (2013.01)
G06F 3/0485 (2013.01)
H04M 1/2745 (2006.01)

(52) U.S. Cl.
CPC ........ G06F 3/04886 (2013.01); G06F 3/0485 (2013.01); H04M 1/274558 (2013.01); H04M 2250/22 (2013.01)

(58) Field of Classification Search
CPC combination set(s) only.
See application file for complete search history.

(56) References Cited

U.S. PATENT DOCUMENTS 5,784,060 A 7/1998 Bertram et al.
5,818,437 A 10/1998 Grover et al.
(Continued)

FOREIGN PATENT DOCUMENTS

CN 101031119 9/2007
EP 1 954 015 8/2008
(Continued)

OTHER PUBLICATIONS

English Abstract translation of KR20090012030 (Published Feb. 2, 2009, claiming priority to TW20070127430).
(Continued)

Primary Examiner — Hien L Duong
(74) Attorney, Agent, or Firm — Birch, Stewart, Kolasch & Birch, LLP

(57) ABSTRACT

An electronic device and a method for displaying content on a touch screen of the electronic device are provided. The electronic device includes a touch screen configured to selectively display a keypad and a search list area, wherein a search list present in the search list area is generated according to data entered via the keypad; and a processor coupled to the touch screen. The processor is configured to, in response to an input signal generated in the search list area and received by the touch screen, control the touch screen to hide the keypad that is currently displayed on the touch screen and enlarge the search list area.

16 Claims, 3 Drawing Sheets

(56) References Cited

U.S. PATENT DOCUMENTS

| | | | |
|---|---|---|---|
| 6,593,949 B1 * | 7/2003 | Chew | G06F 3/0481 345/157 |
| 6,957,397 B1 | 10/2005 | Hawkins et al. | |
| 7,411,582 B2 | 8/2008 | Toepke et al. | |
| 7,533,352 B2 * | 5/2009 | Chew | G06F 3/04883 715/781 |
| 7,574,672 B2 * | 8/2009 | Jobs | G06F 3/0236 345/156 |
| 7,584,429 B2 * | 9/2009 | Fabritius | G06F 3/038 345/156 |
| 8,745,018 B1 * | 6/2014 | Singleton | G06F 17/30899 707/705 |
| 2005/0210402 A1 | 9/2005 | Gunn et al. | |
| 2007/0040813 A1 | 2/2007 | Kushler et al. | |
| 2007/0152984 A1 * | 7/2007 | Ording | G06F 3/04845 345/173 |
| 2008/0055263 A1 | 3/2008 | Lemay et al. | |
| 2008/0122796 A1 | 5/2008 | Jobs et al. | |
| 2008/0167809 A1 * | 7/2008 | Geelen | G01C 21/3655 701/533 |
| 2008/0168381 A1 * | 7/2008 | Nelson | G06F 3/0482 715/780 |
| 2008/0177468 A1 * | 7/2008 | Halters | G01C 21/3611 701/532 |
| 2008/0178098 A1 * | 7/2008 | Yoon | G06F 3/0489 715/762 |
| 2008/0186283 A1 | 8/2008 | Kim et al. | |
| 2009/0079702 A1 | 3/2009 | Colley | |
| 2009/0228825 A1 * | 9/2009 | Van Os | G06F 3/0488 715/780 |

FOREIGN PATENT DOCUMENTS

| | | |
|---|---|---|
| GB | 2 306 078 A | 4/1997 |
| TW | 200741525 | 11/2007 |

OTHER PUBLICATIONS

English language translation of abstract of CN 101031119 (published Sep. 5, 2007).

TW Office Action dated Mar. 28, 2013.

* cited by examiner

ELECTRONIC DEVICE AND AUTOMATICALLY HIDING KEYPAD METHOD AND DIGITAL DATA STORAGE MEDIA

CROSS-REFERENCE TO RELATED APPLICATIONS

This application is a Continuation of co-pending application Ser. No. 12/397,485 filed on Mar. 4, 2009 and for which priority is claimed under 35 U.S.C. § 120. Application Ser. No. 12/397,485 claims priority to Application No. 97115067 filed in Taiwan on Apr. 24, 2008 under 35 U.S.C. 119(a). The entire contents of all are hereby incorporated by reference.

BACKGROUND OF THE INVENTION

Touch screen enables the user to input a command by touching the elements on the screen directly. Touch screen provides users with great convenience in use and has gains great popularity. In order to meet the requirement of miniaturization, portable electronic device normally has a small size, the size of touch screen is relatively reduced.

Let the mobile phones with touch screen currently available on the market be taken for example. In a dialing mode, when the user inputs a number by pressing a dialing keypad shown on the touch screen of the portable electronic device, the records matching the inputted number are shown on the touch screen. For example, when the user inputs the number "0920", the records of telephone numbers in a contact list and/or in a call history that match "0920" will be shown on the touch screen.

As the size of touch screen is reduced, only a few records can be shown on the touch screen if a dialing keypad is concurrently shown on the touch screen. For example, usually only two records can be shown on the touch screen in a mobile phone. Under such circumstances, the user has to drag down a scroll bar or presses a down-shift key or has to manually activate a press key to close the dialing keypad if the user would like to view other records covered by the dialing keypad. Thus, the efficiency of viewing these records is decreased and the inconvenience in use worsens.

SUMMARY OF THE INVENTION

The application is directed to an electronic device, a method for automatically hiding keypad, and a digital data storage medium. The keypad is hidden when the input signal for checking the search list is generated. Thus, the available area on the touch screen for showing the search list is increased, such that the user can view more records of the search list shown on the touch screen.

According to a first aspect of the present application, an electronic device comprising a touch screen and a processing unit is provided. The touch screen is used for showing an input field, a search list, and a keypad, wherein an item of data is received from the keypad and inputted to the input field, and the search list is generated according to the data. The processing unit is coupled to the touch screen. The processing unit hides the keypad when an input signal for checking the search list is generated.

According to a second aspect of the present application, a method for automatically hiding keypad is provided. The method for automatically hiding keypad is applied to an electronic device having a touch screen. The method comprises the following steps. Firstly, an input field and a keypad are shown on the touch screen. Next, an item of data is received from the keypad and inputted to the input field. Then, a search list is shown on the touch screen according to the data. Afterwards, the keypad is hidden when the input signal for checking the search list is generated.

According to a third aspect of the present application, a digital data storage medium is provided. The digital data storage medium has many commands executable on an electronic device, and the electronic device executes a keypad automatically hiding method after having executed these commands. The method comprises the following steps. Firstly, an input field and a keypad are shown on a touch screen of the electronic device. Next, an item of data is received from the keypad and inputted to the input field. Then, a search list is shown on the touch screen according to the data. Afterwards, the keypad is hidden when the input signal for checking the search list is generated.

The application will become apparent from the following detailed description of the preferred but non-limiting embodiments. The following description is made with reference to the accompanying drawings.

DETAILED DESCRIPTION OF THE ILLUSTRATED EMBODIMENTS

Figure 1:
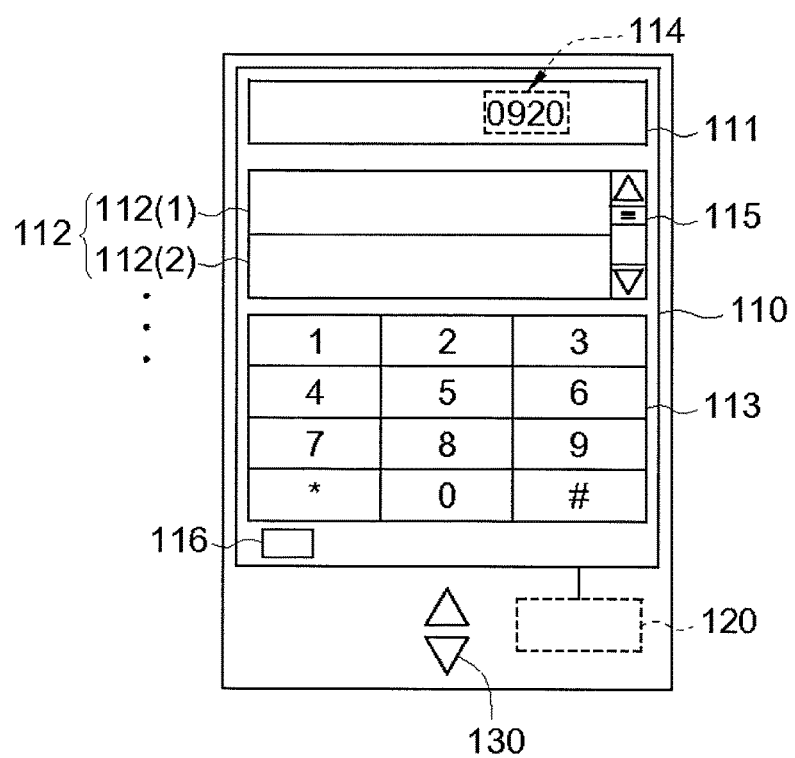
FIG. 1 shows a perspective of an electronic device according to a preferred embodiment of the application.
Figure 2:
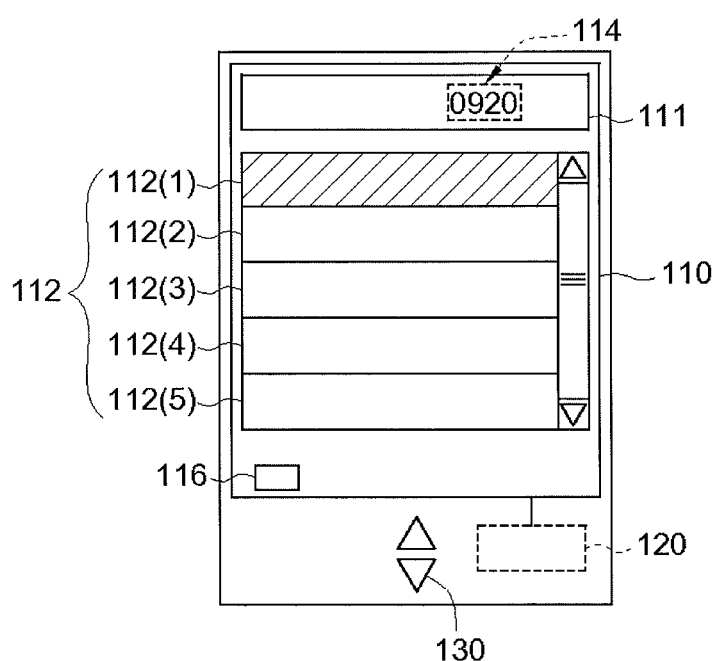
FIG. 2 simulates the keypad of FIG. 1 being hidden.

Referring to both FIG. 1 and FIG. 2. FIG. 1 shows a perspective of an electronic device 100 according to a preferred embodiment of the application. FIG. 2 simulates the keypad 113 of FIG. 1 being hidden. The electronic device 100, such as a touch phone or a personal digital assistant (PDA) phone, comprises a touch screen 110 and a processing unit 120. The touch screen 110 of the electronic device 100 is used for showing an input field 111, a search list 112, and a keypad 113 under a dialing mode. The keypad 113 is used for inputting an item of data Dt to the input field 111. The search list 112 generated according to the data Dt has m records. In the present embodiment of the application, when the user inputs a number or characters, the telephone number or the contact name in the contact list and/or the call history matching with the inputted number and or the inputted characters is searched so as to generate a search list 112. In the present embodiment of the application, m is exemplified by 5, and the search list 112 has 5 records, namely records 112(1)~112(5).

As shown in FIG. 1, when the input field 111, the search list 112, and the keypad 113 are shown on the touch screen 110 at the same time, the user can only view n records of the search list 112 on the touch screen 110, wherein n is a positive integer smaller than m. For example, the user only can view 2 records (n=2), namely records 112(1) and 112(2). By dragging down a scroll bar 115 or using a down-shift key (not illustrated), the user can one by one view other records such as records 112(3)~112(5) as illustrated in FIG. 2. Or, the user needs to touch a software or a hardware key (not illustrated) to close the keypad 113 in order to view more records such as records 112(3)~112(5). However, the above mentioned manners for viewing the records provide low efficiency and increase inconvenience to the user.

A keypad automatically hiding method, an electronic device, and a digital data storage medium are provide in the application to resolve the above problems. The processing unit 120 is coupled to the touch screen 110. Meanwhile, the processing unit 120 hides the keypad 113 as shown in FIG. 2 when an input signal for checking the search list 112, which implies that the user would like to check the data of the search list 112, is generated. The processing unit 120 hides the keypad 113 by controlling the keypad 113 to fly out from the bottom of the touch screen 110. Thus, the available area on the touch screen 110 for showing the search list 112 is increased, so that the user can view more records on the touch screen 110. For example, the user can view records 112(1)~112(5) at the same time, hence increasing the efficiency of viewing the records and improving the convenience in use.

In the present embodiment of the application, the keypad 113 is a number keypad or an alphabetical keypad for example. Besides, the data Dt is an inputted string 114. The inputted string 114, for example, is a telephone number or a contact name inputted by the user by pressing the number keypad, an alphabetical keypad, or a keypad combining a number keypad and an alphabetical. The records 112(1)~112(5) are generated according to the inputted string 114. For example, if the inputted telephone number is "0920," the records are any telephone numbers in a contact list and/or a call history of the electronic device 100 that match "0920." For example, if the inputted contact name is "chen," the records are any contact names in a contact list and/or a call history of the electronic device 100 that match "chen."

Furthermore, when the input signal is generated in one of the records 112(1)~112(5) and is used for checking one of the records 112(1)~112(5), the processing unit 120 hides the keypad 113. However, in other embodiments, the processing unit 120 hides the keypad 110 when the input signal for checking record is generated in a record which is not shown on the current screen unless the user drags down the scroll bar 115 or presses a down-shift key. As shown in FIG. 1, the touch screen 110 shows the input field 111, the 1st to the n-th record (n=2), and the keypad 113. The processing unit 120 hides the keypad 113 when the input signal is generated in the n-th record and is moved to the (n+1)-th record (n+1=3). That is, the processing unit 120 hides the keypad 113 when the input signal is generated in the record 112(2) and moved to the record 112(3).

Furthermore, the processing unit 120 shows the keypad 113 again when an input signal for leaving the search list 112, which implies that the user does not need to check the search list 112, is generated. For example, when the input signal is generated in the last one record 112(5) and is a downward signal by pressing a down-arrow navigation key 130, the processing unit 120 shows the keypad 113 and the input signal is moved to the input filed 111.

The user can generate the input signal by utilizing a navigation key 130 for example. In an embodiment of the application, the input signal can be circulatingly generated between the input field 111 and the records 112(1)~112(5) of the search list 112. The processing unit 120 shows the keypad 113 on the touch screen 110 accordingly when the input signal is generated in the input field 111, which implies that the user would like to input data to the input field 111 by utilizing the keypad 113. For example, when the input signal is generated in the 1st record 112(1) and is an upward signal by pressing an up-arrow navigation key 130, processing unit 120 shows the keypad 113 and the input signal is moved to the input field 111.

In an embodiment of the application, when the input signal is moved to a record of the search list 112, the background color of the current record is different from that of other records.

Moreover, in an embodiment of the application, the touch screen 110 is further used for showing a keypad access key 116. When the keypad access key 116 is activated, the processing unit 120 shows the keypad 113 on the touch screen 110. Thus, the user can instantly show the keypad 113 by pressing the keypad access key 116.

Figure 3:
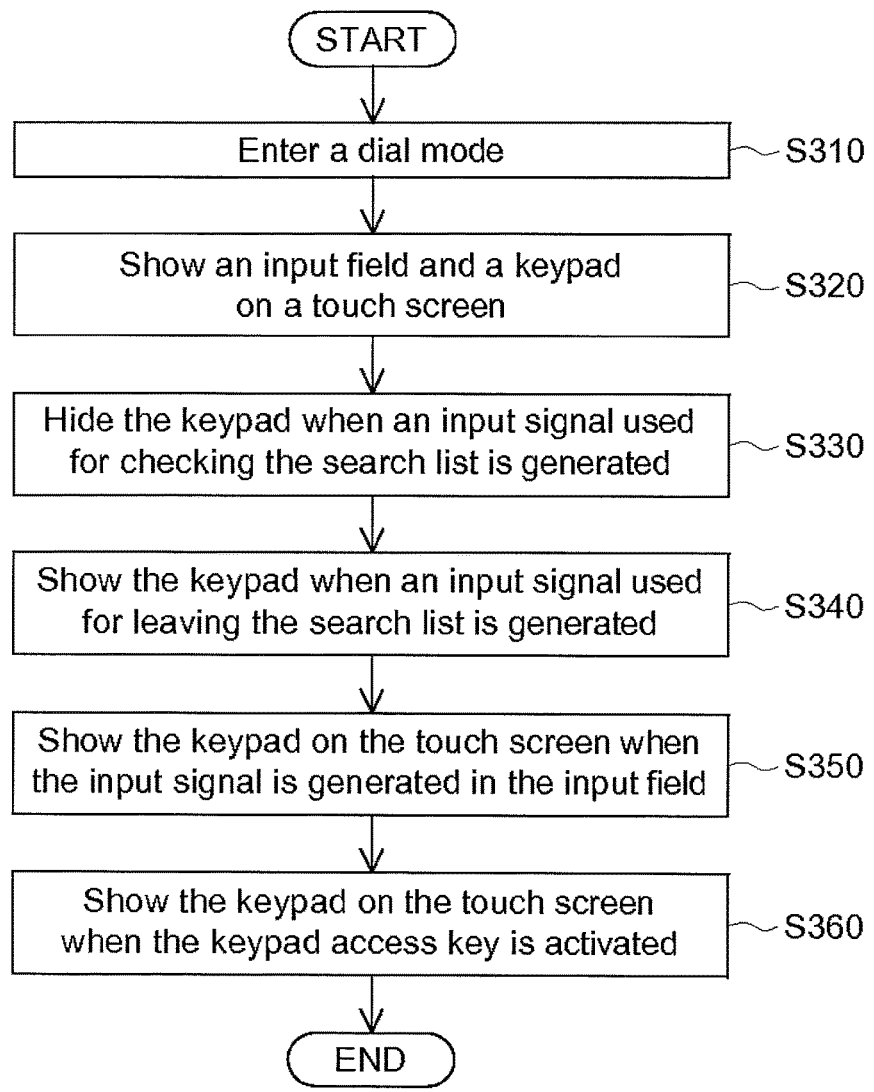
FIG. 3 shows a flowchart of a keypad automatically hiding method according to a preferred embodiment of the application.

FIG. 3 shows a flowchart of a method for automatically hiding keypad according to an embodiment of the application. In the present embodiment of the application, the method for automatically hiding keypad uses the electronic device 100 to execute the steps of FIG. 3, but the application is not limited thereto. Anyone who is skilled in the technology of the application will understand that the steps of the method for automatically hiding keypad and the order thereof can be modified or adjusted according to actual needs.

Firstly, the method begins at step S310, the electronic device enters a dialing mode. Next, as indicated in step S320, an input field 111 and a keypad 113 are shown on a touch screen 110. Next, an item of data Dt is received from the keypad 113 and inputted to the input field 111. The input field 111 has an inputted string 114. A search list 112 having five records 112(1)~112(5) is shown on the touch screen 110 according to the inputted string 114.

Then, the method proceeds to step S330, the processing unit 120 hides the keypad 113 when an input signal for checking the search list 112 is generated. In step S330, the processing unit 120 hides the keypad 113 when the input signal is generated in one of the records 112(1)~112(5). However, the processing unit 120 can hide the keypad 113 only when the input signal is generated in the record 112(2) and moved to the record 113(3).

Furthermore, the method proceeds to step S340, the processing unit 120 shows the keypad 113 again when an input signal for leaving the search list 112, which implies that the user does not need to check the search list 112, is generated.

Next, the method proceeds to step S350, the processing unit 120 shows the keypad 113 on the touch screen 110 when the input signal is generated in the input field 111, which implies that the user needs to input data again. For example, the input signal is a signal for leaving the search list 112 generated in the input field 111. In step S350, the processing unit 120 shows the keypad 113 on the touch screen 110 when the input signal is a downward signal generated in the last record 112(5). Furthermore, the processing unit 120 can also show the keypad 113 on the touch screen 110 when the input signal is an upward signal generated in the 1st record 112(1).

Or, the method proceeds to step S360, the keypad 113 is shown on the touch screen 110 when the keypad access key 116 is activated.

The method for automatically hiding keypad can be compiled into programming codes and stored in a digital data storage medium executable on the electronic device 100. The digital data storage medium, for example, is a secure digital (SD) card, a memory stick (MS) or a multi-media card (MMC), and has the above function of automatically hiding the keypad when executed on the electronic device 100.

An electronic device, method for automatically hiding keypad, and a digital data storage medium are disclosed in above embodiments of the application. The processing unit hides the keypad shown on the touch screen when an input signal for checking the search list, which implies that the user would like to check the data of the search list, is generated, such as the telephone number or the contact name of the contact list and/or the call history. The keypad can be hidden when the input signal is generated in one of the many records of the search list or when the input signal is generated in a record that cannot be viewed unless the scroll bar is dragged down or the down-shift key is pressed. When the keypad is hidden, the available area on the touch screen for showing the search list is increased, and more records, such as telephone numbers and contact names, can be shown on the touch screen at the same time. Thus, the efficiency of viewing the records is increased and user's convenience in use is improved, and the user gains better experience in use and the product competiveness is increased. Furthermore, when the user does not find any useful telephone number or contact in the search list and would like to input a new item of inputted data, the input signal is generated in the input field and the keypad is shown on the touch screen to facilitate the user to input new item to the input field by utilizing the keypad. Also, the user can activate a keypad access key to show the keypad on the touch screen.

While the application has been described by way of example and in terms of a preferred embodiment, it is to be understood that the application is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device, comprising:
    a touch screen configured to display an input field, a keypad and a search list area, wherein a search list present in the search list area is generated according to data entered via the keypad in the input field; and
    a processor coupled to the touch screen,
    wherein the processor is configured to:
    in response to an input signal generated in the input field and received by the touch screen, control the touch screen to show the search list, the search list includes a first part shown between the input field and the keypad, and a second part which is currently hidden and will be shown by scrolling the search list, and
    in response to an input signal for scrolling the search list generated in the search list area and received by the touch screen, control the touch screen to hide the keypad that is currently displayed on the touch screen, enlarge the search list area to show the second part of said search list that is generated before the keypad is hidden, and scroll the search list, the second part of the search list directly joining the first part of the search list,
    wherein the processor is further configured to control the touch screen to display the keypad that is currently hidden from the touch screen in response to a touch input detected within an area of the input field, and
    wherein the processor is further configured to control the touch screen to redisplay the keypad that is currently hidden from the touch screen in response to an input signal generated in the last record of the enlarged search list and continuing moving downward.

2. The electronic device of claim 1, wherein the touch screen is further configured to display a keypad access key, and the processor is further configured to, in response to activation of the keypad access key, control the touch screen to either display the keypad that is currently hidden from the touch screen or hide the keypad that is currently displayed on the touch screen.

3. The electronic device of claim 1, wherein the search list is partially present in the search list area when the keypad is displayed on the touch screen, at least one record in the search list is additionally present in the search list area after the keypad is hidden and the search list area is enlarged, and the at least one record is not present in the search list area before the keypad is hidden and the search list area is enlarged.

4. The electronic device of claim 1, wherein the input signal generated in the search list area is an upward signal or a downward signal.

5. The electronic device of claim 1, wherein the input signal generated in the search list area is a scrolling signal scrolling up the search list or a scrolling signal scrolling down the search list.

6. The electronic device of claim 1, wherein the input signal generated in the search list area is an upward scrolling signal or a downward scrolling signal.

7. The electronic device of claim 1, wherein the keypad is a dialing keypad, and the search list comprises at least one record searched from a contact list according to the data entered via the keypad.

8. A method for displaying content on a touch screen of an electronic device, comprising:
    displaying an input field, a keypad and a search list area on the touch screen;
    in response to an input signal generated in the input field, generating a search list according to data entered via the keypad in the input field and displaying the search list in the search list area, the search list including a first part shown between the input field and the keypad, and a second part which is currently hidden and will be shown by scrolling the search list;
    in response to an input signal for scrolling the search list generated in the search list area and received by the touch screen, hiding the keypad that is currently displayed on the touch screen, enlarging the search list area to show the second part of said search list that is generated before the keypad is hidden, and scrolling the search list, the second part of the search list directly joining the first part of the search list; and
    in response to a touch input detected within an area of the input field, displaying the keypad that is currently hidden from the touch screen,
    wherein the method further comprises the step of redisplaying the keypad that is currently hidden from the touch screen in response to an input signal generated in the last record of the enlarged search list and continuing moving downward.

9. The method of claim 8, further comprising
    displaying a keypad access key on the touch screen; and
    in response to activation of the keypad access key, either displaying the keypad that is currently hidden from the touch screen or hiding the keypad that is currently displayed on the touch screen.

10. The method of claim 8, wherein the search list is partially present in the search list area when the keypad is displayed on the touch screen, the method further comprising:
    presenting at least one record in the search list in the search list area after the keypad is hidden and the search list area is enlarged, wherein the at least one record is not present in the search list area before the keypad is hidden and the search list area is enlarged.

11. The method of claim 8, wherein the input signal generated in the search list area is an upward signal or a downward signal.

12. The method of claim 8, wherein the input signal generated in the search list area is a scrolling signal scrolling up the search list or a scrolling signal scrolling down the search list.

13. The method of claim 8, wherein the input signal generated in the search list area is an upward scrolling signal or a downward scrolling signal.

14. The method of claim 8, wherein the keypad is a dialing keypad, and the search list comprises at least one record searched from a contact list according to the data entered via the keypad.

15. The electronic device of claim 1, wherein the processor is further configured to control the touch screen to redisplay the keypad that is currently hidden from the touch screen in response to an input signal generated in the first record of the enlarged search list and continuing moving upward.

16. The method of claim 8, wherein the method further comprises the step of redisplaying the keypad that is currently hidden from the touch screen in response to an input signal generated in the first record of the enlarged search list and continuing moving upward.

\* \* \* \* \*